United States Patent [19]

Nakashima

[11] 4,173,535
[45] Nov. 6, 1979

[54] FILTER CLOTH WASHING DEVICE FOR FILTER PRESS

[75] Inventor: Hiromasa Nakashima, Tajimi, Japan

[73] Assignee: NGK Insulators, Ltd., Nagoya, Japan

[21] Appl. No.: 891,285

[22] Filed: Mar. 29, 1978

[30] Foreign Application Priority Data

Apr. 5, 1977 [JP] Japan .............................. 52-41594[U]

[51] Int. Cl.$^2$ ............................................ B01D 25/32
[52] U.S. Cl. .................................... 210/225; 210/224; 100/197
[58] Field of Search ................ 210/224, 225, 227, 228, 210/230, 231; 285/157, 30, 114; 100/193, 197

[56] References Cited

U.S. PATENT DOCUMENTS

| 700,378 | 5/1902 | Schmidt | 285/114 |
|---|---|---|---|
| 3,698,557 | 10/1972 | Ishigaki | 210/225 |
| 3,807,567 | 4/1974 | Iwatani | 210/225 |

FOREIGN PATENT DOCUMENTS 163105  5/1921  United Kingdom ...................... 210/231

Primary Examiner—Charles N. Hart
Assistant Examiner—David R. Sadowski
Attorney, Agent, or Firm—Stevens, Davis, Miller & Mosher

[57] ABSTRACT

A filter cloth washing device for a filter press, wherein wash water is sprayed on filter cloths trained about rollers positioned below the filter plates. In the device, wash water supply pipes having a plurality of spraying nozzles run parallel to the rollers, and have coupling means on at least one of their ends. Each coupling means has an inner diameter larger than the inner diameter of its respective water supply pipe, first and second communication ports and flexible pressure hoses for connecting neighboring coupling means to each other. The connection between neighboring coupling means is such that the first communication port of one coupling means is connected by a flexible pressure hose to the first communication port in another coupling means upstream and its second communication port is connected by another flexible pressure hose to the second communication port of yet another coupling means downstream. If the number of filter plates is increased, the water for washing the increased number of filter cloths may be supplied easily and positively by additional pressure hoses of the same length and type.

2 Claims, 3 Drawing Figures

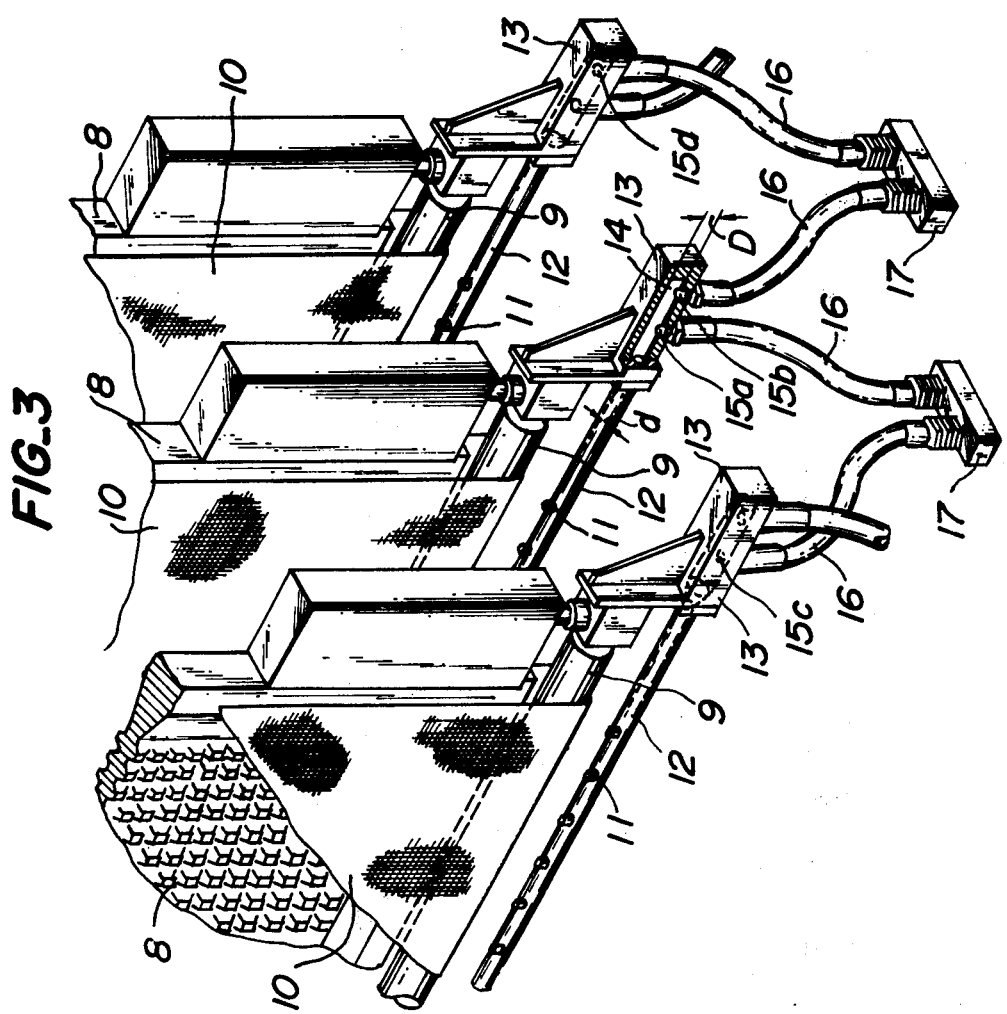

FILTER CLOTH WASHING DEVICE FOR FILTER PRESS

BACKGROUND OF THE INVENTION

This invention relates to a filter cloth washing device for a filter press, wherein each filter cloth provided for every filter plate travels individually and is washed by a washing device attached to that filter plate.

Hitherto, it has been usual that filter cloths clogged due to cyclical dehydrating operations are washed by spraying pressurized water thereon.

A well-known filter cloth washing device for a travelling filter cloth type filter press, in which each filter cloth provided for every filter plate is adapted to travel individually, is so arranged that, as shown in FIG. 1, a plurality of washing water pipes 2, having a plurality of washing-water spraying nozzles, and substantially equal in length to a width of a filter cloth run below respective filter plates 1, 1′ ... in parallel relation thereto a washing water header pipe 5 runs between a front fixed frame 3 and a rear fixed frame 4 of the filter press, which water header pipe is long enough to cover the distance between these fixed frames 3 and 4. The washing water header pipe 5 and respective water pipes 2 running below filter plates 1, 1′ ... are connected to each other by means of pressurized rubber hoses 6.

In discharging cakes or washing the filter cloths, this prior art device has the following disadvantages. That is to say, all of filter plates 1, 1′ ... must be shifted open simultaneously, and therefore distances of shift of the filter plates which are located at the side close to the movable frame 7 are much larger than that of the filter plates which are located at the side close to fixed frame 3. For this reason, with such a washing device, pressure rubber hoses 6 connecting water pipes 2 below respective filter plates 1, 1′ ... with washing water header pipe 5 must be increased in length towards the filter plate located on the side of the movable frame 7. A shortcoming is thus encountered with the existing filter press having a large number of filter plates in that a number of long, washing, pressure rubber hoses 6 project in a bent state to the lower portion of the side wall of the filter press, and these hoses are likely to entangle one another in the portion close to the filter plates, thus greatly reducing the peripheral maintenance space of the filter press.

SUMMARY OF THE INVENTION

It is accordingly an object of the present invention to provide a filter cloth washing device for a filter press, wherein regardless of the increase in number of filter plates, water for washing the increased number of filter cloths may be supplied by increasing the number of pressure rubber hoses, each of which is the same in length and type, without the need for preparing pressure rubber hoses which are different in length and type, thereby providing an increased, effective maintenance space in the area close to the filter press.

To attain this object, there is provided according to the present invention a filter cloth washing device for a filter press, which comprises; a plurality of washing water supply pipes, at least one such pipe for every filter plate, each pipe having a plurality of spraying nozzles 11 and running in parallel to the lower filter cloth rollers for said plate; a plurality of coupling means, one for each said pipe and connected to at least one end of thereof each coupling means having the inner diameter larger than an inner diameter of its respective water supply pipe, and first and second communication ports in each of said coupling means. As assembled, the first communication port in one coupling means attached to one filter plate is connected by a flexible pressure hose to the first communication port in another coupling means attached to the other filter plate upstream of said one filter plate, and its second communication port is connected by another flexible pressure hose to the second communication port in yet another coupling means attached to yet another filter plate downstream.

BRIEF DESCRIPTION OF THE DRAWINGS

FIG. 3 is a fragmentary perspective view of the device in FIG. 2.

DESCRIPTION OF PREFERRED EMBODIMENT

Figure 1:
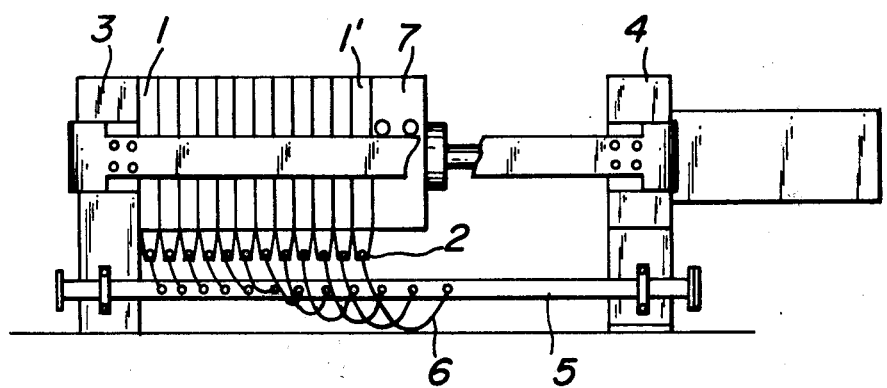
FIG. 1 is a schematic side view of a prior art filter cloth washing device for a travelling filter cloth type filter press.
Figure 2:
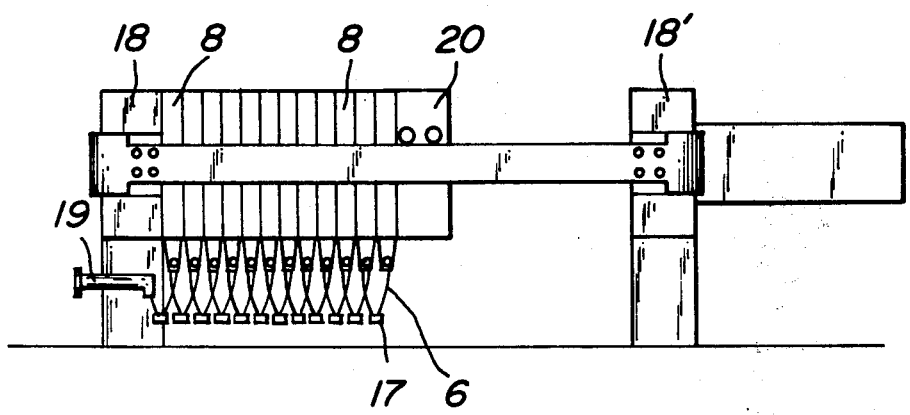
FIG. 2 is a schematic side view of a filter cloth washing device for a filter press, according to the present invention.

Referring to FIGS. 2 and 3 which are illustrative of the arrangements of the present invention, there is provided a plurality of washing water supply pipes 12 each having a water-spraying nozzle 11 for spraying water to respective filter cloths 10 trained about filter plates 8 and lower rollers 9 provided below the bottom end of respective filter plates 8. Each water supply pipe 12 runs below its respective lower roller 9 in parallel thereto, with its spraying nozzles 11 directed in opposing relation to the surfaces of respective filter cloths 10, and is fixedly retained below the filter plates 8 by its respective coupling means 13. Coupling means 13, by which the water supply pipe is fixedly retained at one end thereof, has a bore 14 having an inner diameter D larger than an inner diameter d of water supply pipe 12 connected thereto, and bore 14 is communicated with the corresponding water supply pipe 12. Coupling means 13 has a first (or inner) communication port 15a and a second (or outer) communication port 15b, both of which are opened to bore 14.

First communication port 15a in one coupling means 13 attached to one filter plate 8 is connected by way of a flexible pressure hose 16 to a first communication port 15c in another coupling means 13 attached to another filter plate 8 upstream of the aforesaid one filter plate 8, and second communication port 15b in the aforesaid one coupling means 13 is connected by way of the another flexible pressure hose 16 to a second communication port 15d in yet another coupling means 13 attached to yet another filter plate 8 downstream of the aforesaid one filter plate.

First communication ports 15a (or second communication port 15b) in one coupling means 13 may be connected to either first communication port 15c or second communication port 15d in another coupling means 13, a long as the result of the connections is one downstream and one upstream of the said one coupling means. It is, however, preferable that, the inner communication port in one coupling means as viewed in the longitudinal axis thereof is connected to the inner communication port in the neighboring coupling means, and the outer communication port in the former to the outer communication port in the latter, respectively, so that respective flexible pressure hose 16 remain untwisted when filter plates 8 are shifted between an open position and a closed position.

While the connection between neighboring coupling means 13 and 13 is accomplished by flexible pressure hose 16 alone as described above, the use of a metallic joint 17 is preferable, which joint 17 is resistant to breaking or cracking even when the filter plates are brought into a close position, as a result of which flexible pressure hoses 16 are prevented from being bent and cracked when the filter plates are brought into a close position. It is more preferable that, instead of the joint 17, a U-shaped pipe be used for interconnecting the neighboring coupling means.

Each water supply pipe 12 may be disposed between the bottom end of filter plate 8 and lower roller 9 in a manner to spray pressurized water to each filter cloth 10 from inside thereof, rather than disposed below the lower roller 9. Further, while coupling means 13 of neighboring filter plates 8 are connected to each other by means of flexible pressure hoses 16 in the embodiment shown, the plurality of coupling means may alternatively be connected to every other plate. Coupling means 13 is not limited to the configuration shown, but may be of other configurations, such as a Y-shape or T-shape.

One communication port in coupling means 13 attached to the filter plate 8 adjacent to a fixed frame 18 of the filter press is connected to a supply pipe 19 rigidly secured to fixed frame 18. Likewise, one communication port in coupling means 13 attached to filter plate 8 adjacent to a movable frame 20 is sealingly closed with a plug (not shown).

After the filter plates have been shifted to an open position and cake has been removed from respective filter cloths 10, if pressurized water is fed to supply pipe 19, then the washing water will be distributed by way of flexible pressure hoses 16 to water supply pipes 12, and from spraying nozzles 11 to the surface of respective filter cloths 10, to thereby wash the filter cloth. At this juncture, each filter cloth 10 trained about the lower roller 9 is caused to travel therealong, so that respective filter cloths 10 are washed over their entire filtering surface uniformly.

With the filter cloth washing device according to the present invention, even in the event of the number of filter plates being increased, the water for washing the increased number of filter cloths may be supplied easily and positively by increasing the number of pressure hoses. Since these hoses are of the same in length and type, there is no need to prepare a variety of pressure hoses differing in length and type as in the prior art device. This advantage results in the present invention being compact and affords a larger maintenance space in the side portion of the filter press. The present invention is easily adaptable for existing filter presses with less cost, and so, is practical for industrial purposes.

What has been described should be considered as explaining the principle of the invention. Various changes and modifications may be made by those skilled in the art without departing the spirit and scope of the invention and appended claims.

What is claimed is:

1. In a filter cloth washing device for a filter press, wherein washing water is sprayed on filter cloths respectively trained about lower rollers positioned below the bottom end of respective filter plates and adapted to travel thereabout, thereby washing respective filter cloths, the improvements comprising a plurality of washing water supply pipes respectively having a plurality of spraying nozzles and running in parallel to said respective lower rollers;

a plurality of coupling means connected to at least one end of each of said water supply pipes, respectively, each of said coupling means having an inner diameter larger than an inner diameter of its respective water supply pipe, and first and second communication ports; and a plurality of flexible pressure hoses for connecting the neighboring coupling means to each other, wherein a metallic joint is provided to connect two flexible pressure pipes for interconnecting the neighboring coupling means;

the connection among the neighboring coupling means being such that the first communication port in one coupling means attached to one filter plate is connected by way of one flexible pressure hose through the metallic joint to a first communication port in another coupling means attached to another filter plate upstream of said one filter plate, and the second communication port in said one coupling means is connected by way of another flexible pressure hose through another metallic joint to a second communication port in another coupling means attached to another filter plate downstream of said one filter plate.

2. The improvements as defined in claim 1, wherein the metallic joint is a U-shaped pipe.

* * * * *